United States Patent
Kaemmerer

(10) Patent No.: US 11,543,960 B2
(45) Date of Patent: Jan. 3, 2023

(54) REVOLVING ON-SCREEN VIRTUAL KEYBOARD FOR EFFICIENT USE DURING CHARACTER INPUT

(71) Applicant: GOOGLE LLC, Mountain View, CA (US)

(72) Inventor: Daniel Kaemmerer, San Bruno, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/043,635

(22) PCT Filed: Jan. 15, 2019

(86) PCT No.: PCT/US2019/013680
§ 371 (c)(1),
(2) Date: Sep. 29, 2020

(87) PCT Pub. No.: WO2020/117293
PCT Pub. Date: Jun. 11, 2020

(65) Prior Publication Data
US 2021/0365180 A1    Nov. 25, 2021

Related U.S. Application Data

(60) Provisional application No. 62/775,149, filed on Dec. 4, 2018.

(51) Int. Cl.
*G06F 3/04886* (2022.01)
*G06F 3/023* (2006.01)
(Continued)

(52) U.S. Cl.
CPC ........ *G06F 3/04886* (2013.01); *G06F 3/0236* (2013.01); *G06F 3/0237* (2013.01);
(Continued)

(58) Field of Classification Search
CPC .. G06F 3/0233; G06F 3/0236; G06F 3/04886; G06F 3/0482; G06F 3/04892;
(Continued)

(56) References Cited

U.S. PATENT DOCUMENTS 6,144,378 A    11/2000  Lee
6,370,282 B1 *  4/2002  Pavley .................. G06F 3/0236
                                                     348/333.02

(Continued)

FOREIGN PATENT DOCUMENTS

DE    102013004245 A1    9/2014

OTHER PUBLICATIONS

PCT International Search Report and Written Opinion for International Application No. PCT/US2019/013680, dated Aug. 5, 2019, 14 pages.

*Primary Examiner* — Nicholas Ulrich
(74) *Attorney, Agent, or Firm* — Lowenstein Sandler LLP

(57) ABSTRACT

A method includes displaying a user interface on a display of a client device. The user interface includes a virtual keyboard including characters arranged in rows and columns. The method also includes fixing a focus of a cursor displayed in the user interface to a first row or a first column in the virtual keyboard, responsive to receiving a first request to move the cursor in a first direction in the virtual keyboard, wrapping the one of the characters around the row or the column to a last row or a last column of the virtual keyboard to present another of the characters within the focus of the cursor, and responsive to receiving a second request to move the cursor in the virtual keyboard in a second direction, moving the focus of the cursor to a list of word suggestions.

20 Claims, 9 Drawing Sheets

(51) Int. Cl.
*G06F 3/0482* (2013.01)
*G06F 3/0485* (2022.01)
*H04N 21/422* (2011.01)

(52) U.S. Cl.
CPC .......... *G06F 3/0482* (2013.01); *G06F 3/0485* (2013.01); *H04N 21/42213* (2013.01)

(58) Field of Classification Search
CPC ................ G06F 3/0485; G06F 3/0237; H04N 21/42204; H04N 21/42213; H04N 21/42214
See application file for complete search history.

(56) References Cited

U.S. PATENT DOCUMENTS

| | | | |
|---|---|---|---|
| 8,386,958 B1* | 2/2013 | Zavitaev | G06F 3/0236 715/810 |
| 9,063,642 B2* | 6/2015 | Edwards | G06F 3/04842 |
| 9,241,101 B2* | 1/2016 | Marino | G11B 27/034 |
| 9,292,082 B1* | 3/2016 | Patel | G02B 27/01 |
| 10,078,423 B2* | 9/2018 | Bouaziz | G06F 3/0236 |
| 2007/0209016 A1 | 9/2007 | Takayama et al. | |
| 2009/0019401 A1 | 1/2009 | Park et al. | |
| 2014/0250405 A1* | 9/2014 | Wheeler | G06F 3/0236 715/780 |
| 2015/0121293 A1* | 4/2015 | Pickersgill | G06F 3/04842 715/780 |
| 2016/0231885 A1* | 8/2016 | Lee | G06F 3/0485 |
| 2017/0045953 A1* | 2/2017 | Rogers | H04N 21/482 |
| 2018/0267615 A1* | 9/2018 | Freeman | G06F 3/017 |

* cited by examiner

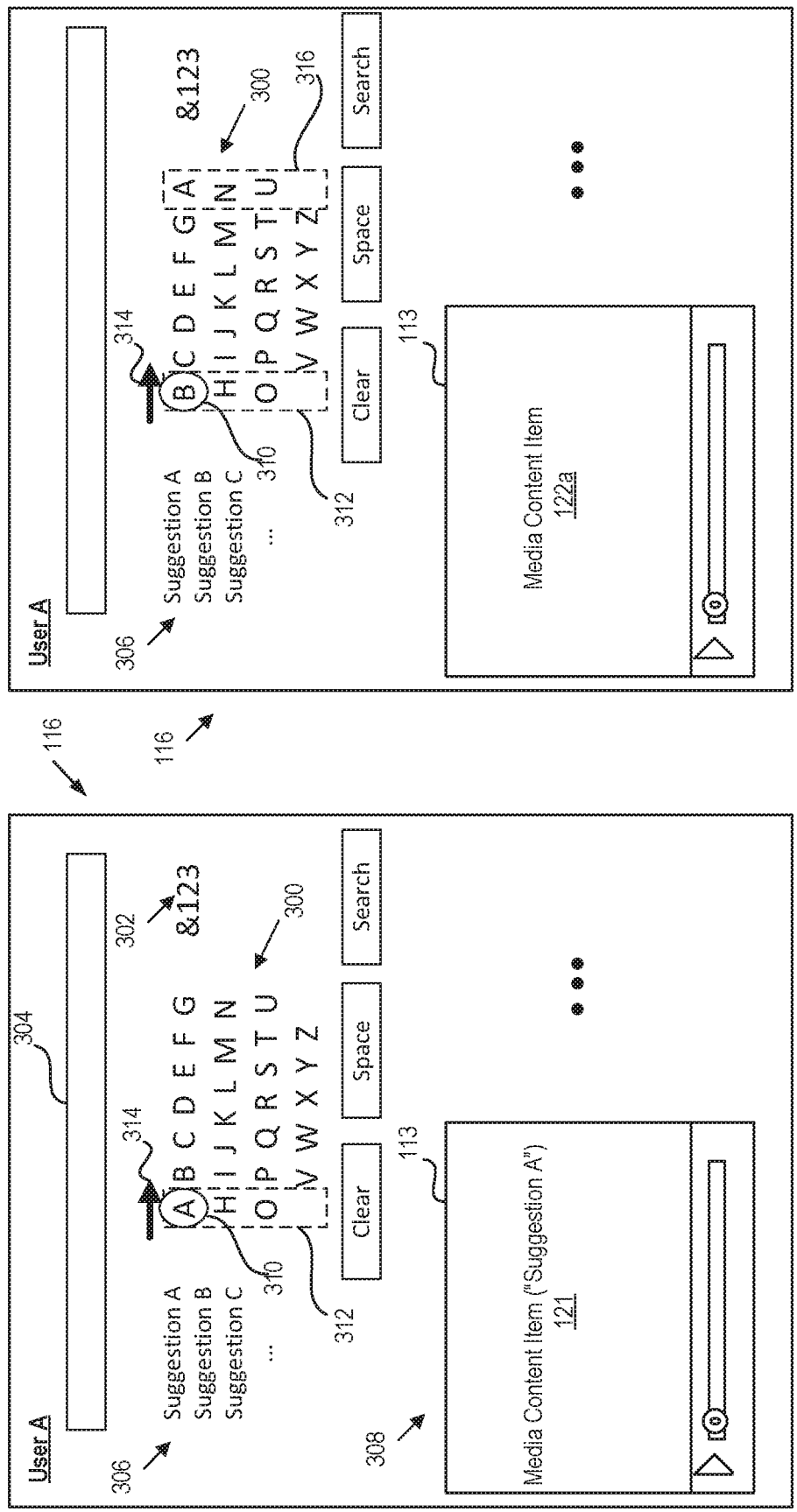

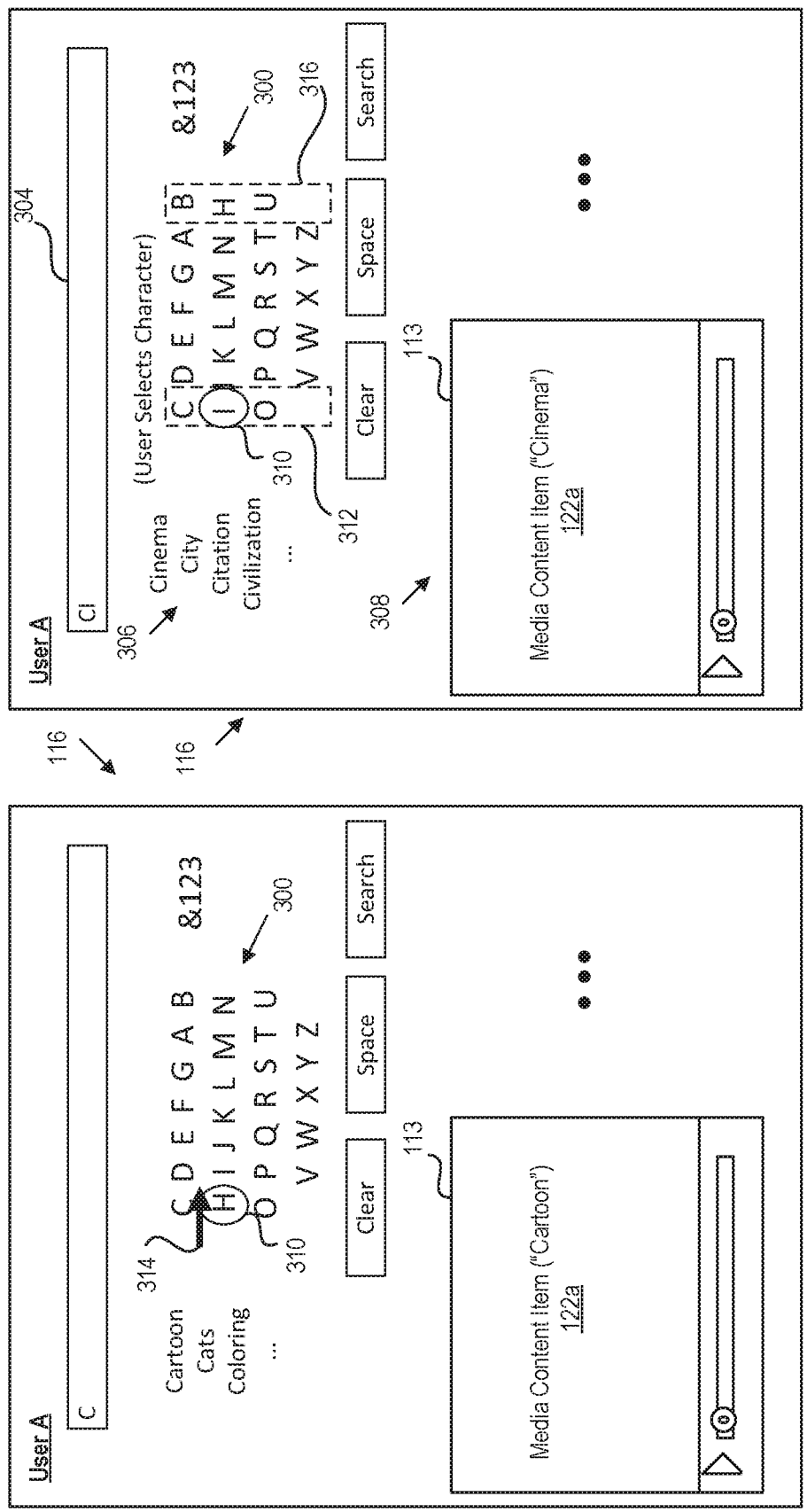

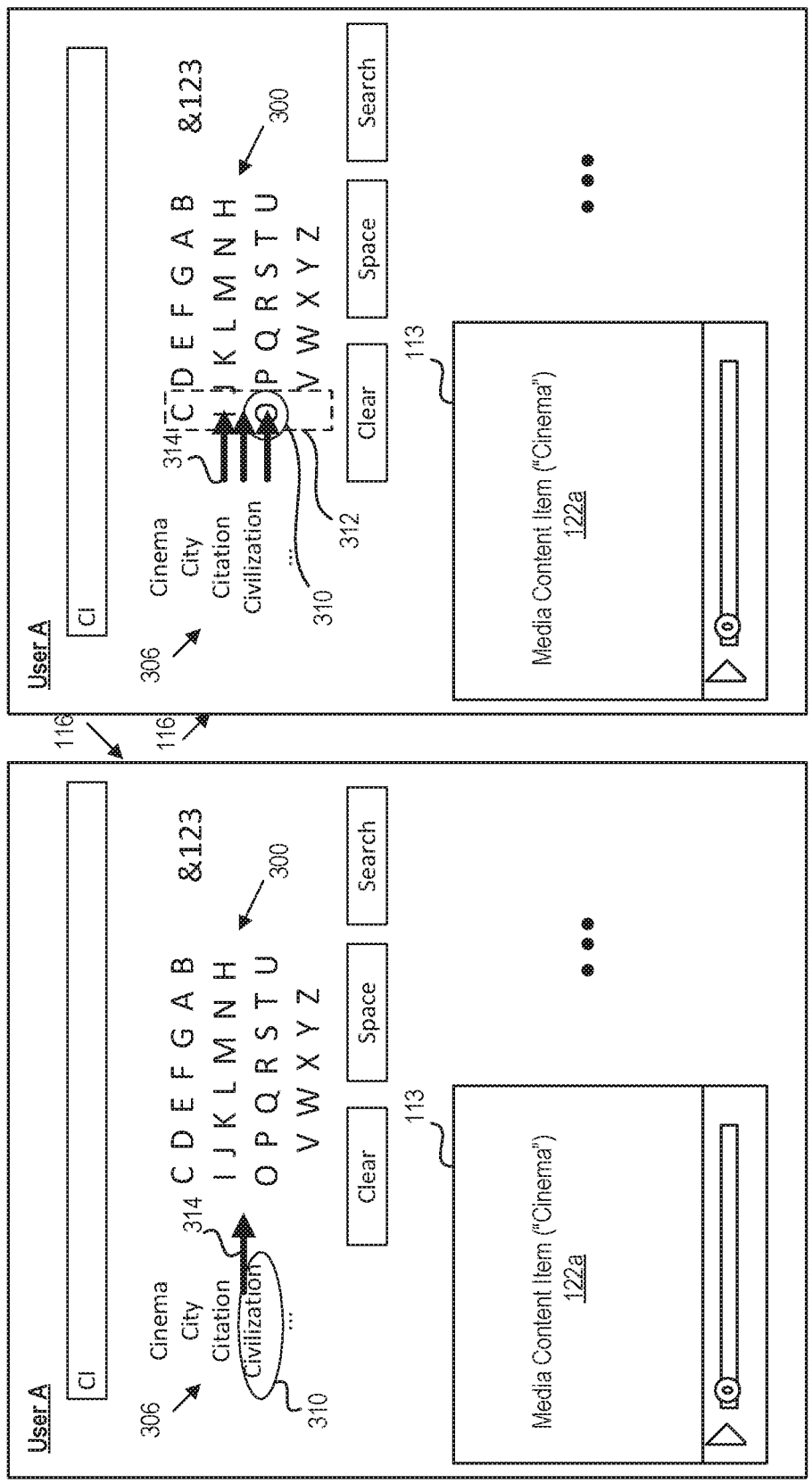

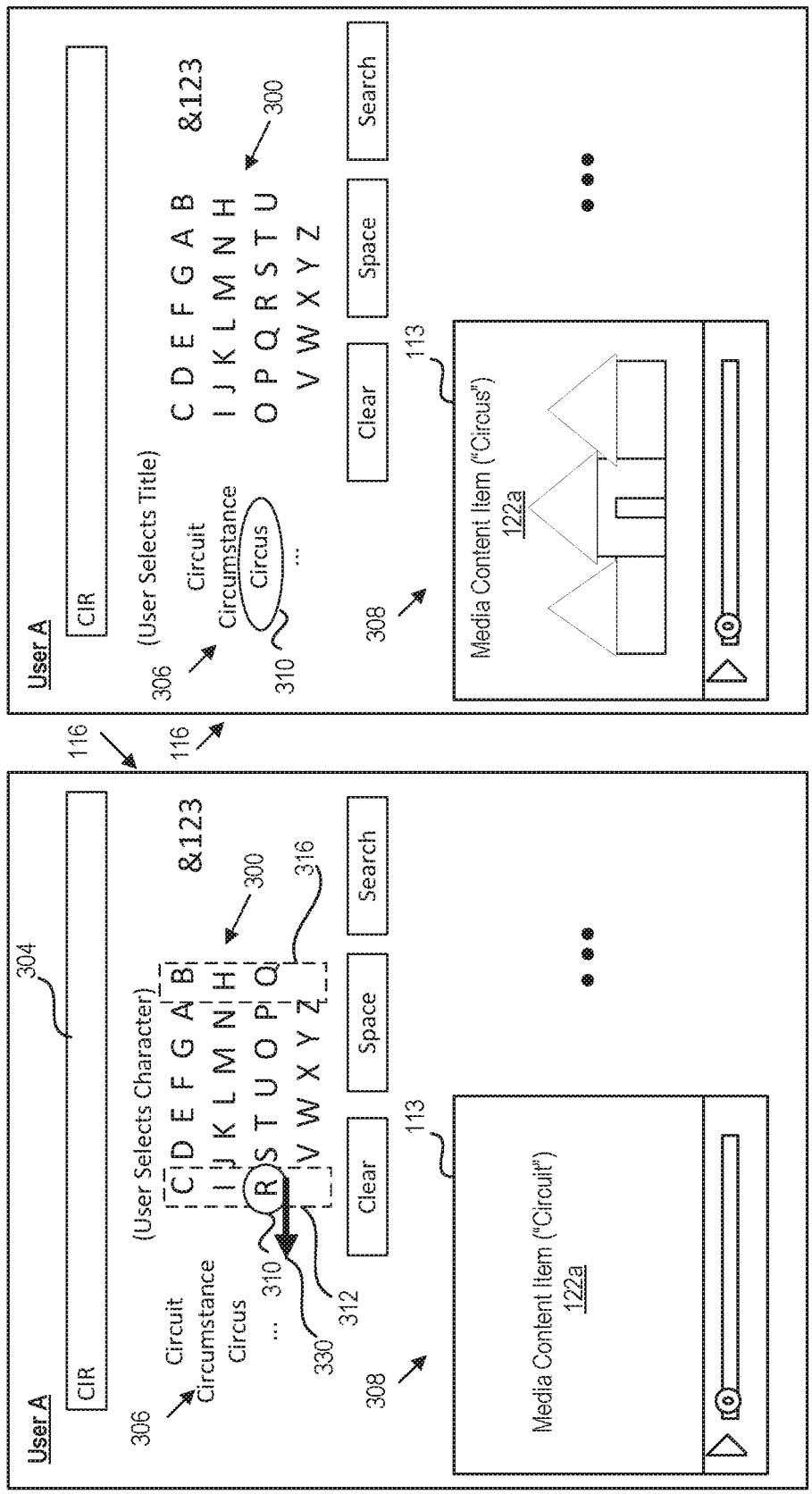

REVOLVING ON-SCREEN VIRTUAL KEYBOARD FOR EFFICIENT USE DURING CHARACTER INPUT

TECHNICAL FIELD

Aspects and implementations of the present disclosure relate to a virtual keyboard, and more specifically, to a revolving on-screen virtual keyboard for efficient use during character input.

BACKGROUND

Various platforms may provide media content items that are shared by users (e.g., user-uploaded videos, live-streaming videos) and/or provided by various entities (e.g., movies and/or television shows made by production studios). The media content items may include pre-recorded or live-streaming content that is presented to a user on a client device via a user interface of the platforms. The user may access the user interface and use a virtual keyboard to enter a search query for a desired media content item to consume. Other platforms may provide a virtual keyboard to input characters to perform various operations (e.g., writing a review, writing an electronic message, entering a uniform resource locator, etc.) associated with the platforms. Using certain electronic devices to input characters with conventional virtual keyboards may be tedious and entail entering an inefficient number of key inputs to enter the desired characters.

SUMMARY

The subject matter of the disclosure relates to reducing the number of key-presses required to input characters by using an enhanced user interface. A virtual keyboard can include one or more characters, symbols, numbers, and/or special characters. A focus of a cursor can be fixed to a first column or a first row in the virtual keyboard. A list of word suggestions may be displayed immediately adjacent to the first row or the first column. The word suggestions may be associated with a search suggestion (e.g., title of a media content item), word auto-completions for any suitable purpose (e.g., typing out a website URL, email address, word completions to facilitate writing user feedback, etc.), or the like. The user's cursor focus position may be one-click away from accessing the list of word suggestions that may enable the user to quickly complete their query without needing to fully type it to completion (e.g., reducing key presses). When a user requests to move the cursor in the keyboard in a first direction, the character currently in the focus of the cursor may wrap around the first column to a last column or around the first row to a last row while the cursor remains fixed at its current location in the first column and/or first row in the virtual keyboard. The characters may wrap around a vertical axis or a horizontal axis within the virtual keyboard in a cylindrical fashion. The movement of the characters in the virtual keyboard may be restricted to a direction opposite the first direction (e.g., from right to left or from down to up). When the user requests to move the cursor in the virtual keyboard in a second direction, the cursor may move to the list of word suggestions.

Constructing the virtual keyboard in this way allows the users cursor focus to have immediate access to the list of word suggestions regardless of which character is positioned within the focus of the cursor. In particular, when the cursor is within the virtual keyboard, the focus of the cursor may be just one-click away from the list of word suggestions at any given time. Accordingly, the user may complete a search with far fewer clicks than if the cursor was at a very far edge of the virtual keyboard at the time the appropriate search suggestion materializes. Reducing the number of key inputs may reduce the computing resources consumed by an input electronic device (e.g., remote controller), a client device displaying the virtual keyboard that processes the key inputs and displays search results, and a server that performs searches using the input characters and returns the search results. Additionally, by keeping the word suggestions visually close to the cursor at any given time, the user's eye-gaze/visual focus is going to be centered on the word suggestions more of the time, thereby providing an easier time identifying when the suggestion they are looking for appears. Accordingly, the user experience may be enhanced when using the disclosed techniques.

According to one aspect of the present disclosure there is provided a method comprising: displaying a user interface on a display of a client device, the user interface comprising a virtual keyboard including a plurality of characters arranged in one or more rows and one or more columns; fixing a focus of a cursor displayed in the user interface to a first row of the one or more rows or a first column of the one or more columns in the virtual keyboard, wherein at least one of the plurality of characters is within the focus of the cursor; responsive to receiving a first request to move the cursor in a first direction in the virtual keyboard, wrapping the at least one of the plurality of characters around the row or the column to a last row or a last column of the virtual keyboard to present another of the plurality of characters within the focus of the cursor; and responsive to receiving a second request to move the cursor in the virtual keyboard in a second direction, moving the focus of the cursor to a list of word suggestions.

The method may further comprise restricting movement of the plurality of characters within the virtual keyboard to a direction opposite to the first direction.

The method may further comprise displaying the list of word suggestions immediately adjacent to the first row or the first column.

The first direction may be a horizontal direction; and the method may further comprise, responsive to receiving the first request to move the cursor in the horizontal direction in the virtual keyboard, wrapping the at least one of the plurality of characters around the first column to the last column in the virtual keyboard.

Alternatively, the first direction is a vertical direction; and the method may further comprise, responsive to receiving the first request to move the cursor in the vertical direction in the virtual keyboard, wrapping the at least one of the plurality of characters around the first row to the last row in the virtual keyboard.

The method may further comprise displaying a query builder that displays one or more characters as the one or more characters are selected from the virtual keyboard.

The last row may be located at an opposing side of the virtual keyboard from the first row and the last column may be located at an opposing side of the virtual keyboard from the first column.

The method may further comprise: responsive to receiving a third request to select one of the plurality of characters that are within the focus of the cursor, updating the list of word suggestions to include one or more entries including the selected one of the plurality of characters.

The at least one of the one or more entries in the list may have a word that is automatically completed based on the selected one of the plurality of characters.

The second direction may be opposite the first direction.

The plurality of characters may comprise all letters or symbols of a language being presented in the virtual keyboard.

The client device may be a television and the first request and the second request may be received from a remote controller in communication with the television.

According to another aspect of the present disclosure there is provided a non-transitory, computer-readable medium storing instructions that, when executed, cause a processing device to: display a user interface on a display of a client device, the user interface comprising a virtual keyboard including a plurality of characters arranged in one or more rows and one or more columns; fix a focus of a cursor displayed in the user interface to a first row of the one or more rows or a first column of the one or more columns in the virtual keyboard, wherein at least one of the plurality of characters is within the focus of the cursor; responsive to receiving a first request to move the cursor in a first direction in the virtual keyboard, wrap the at least one of the plurality of characters around the row or the column to a last row or a last column of the virtual keyboard to present another of the plurality of characters within the focus of the cursor; and responsive to receiving a second request to move the cursor in the virtual keyboard in a second direction, move the focus of the cursor to a list of word suggestions.

The instructions, when executed, may cause the processing device to restrict movement of the plurality of characters within the virtual keyboard to a direction opposite the first direction.

The instructions, when executed, may cause the processing device to display the list of word suggestions immediately adjacent to the first row or the first column.

The first direction may be a horizontal direction; and the instructions, when executed, may cause the processing device to, responsive to receiving the first request to move the cursor in the horizontal direction in the virtual keyboard, wrap the at least one of the plurality of characters around the first column to the last column in the virtual keyboard.

Alternatively, the first direction may be a vertical direction; and the instructions, when executed, may cause the processing device is further to, responsive to receiving the first request to move the cursor in the vertical direction in the virtual keyboard, wrap the at least one of the plurality of characters around the first row to the last row in the virtual keyboard.

The instructions, when executed, may cause the processing device to display a query builder that displays one or more characters as the one or more characters are selected from the virtual keyboard.

The last row may be located at an opposing side of the virtual keyboard from the first row and the last column may be located at an opposing side of the virtual keyboard from the first column.

According to another aspect of the present disclosure there is provided a system, comprising: a memory device; a processing device operatively coupled to the memory device, the processing device to: display a user interface on a display of a client device, the user interface comprising a virtual keyboard including a plurality of characters arranged in one or more rows and one or more columns; fix a focus of a cursor displayed in the user interface to a first row of the one or more rows or a first column of the one or more columns in the virtual keyboard, wherein at least one of the plurality of characters are within the focus of the cursor; responsive to receiving a first request to move the cursor in a first direction in the virtual keyboard, wrap the at least one of the plurality of characters around the row or the column to a last row or a last column of the virtual keyboard to present another of the plurality of characters within the focus of the cursor; and responsive to receiving a second request to move the cursor in the virtual keyboard in a second direction, move the focus of the cursor to a list of word suggestions.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3A illustrates an example of a user interface including a virtual keyboard where the user has selected to move the cursor in a first horizontal direction, in accordance with one implementation of the disclosure.

FIG. 3B illustrates an example of a user interface including a virtual keyboard where the characters have wrapped around a vertical axis based on the selection in FIG. 3A, and the user has selected to move the cursor in the first horizontal direction, in accordance with one implementation of the disclosure.

FIG. 3E illustrates an example of a user interface including a virtual keyboard where the cursor has moved down a row based on the selection in FIG. 3D, and the user has selected to move the cursor in the first horizontal direction, in accordance with one implementation of the disclosure.

FIG. 3F illustrates an example of a user interface including a virtual keyboard where the characters have wrapped around a vertical axis based on the selection in FIG. 3E, and the user has selected a character under the focus of the cursor to add to a query builder, in accordance with one implementation of the disclosure.

FIG. 3I illustrates an example of a user interface including a virtual keyboard where the user has selected to move the cursor in a horizontal direction to return to the virtual keyboard, in accordance with one implementation of the disclosure.

FIG. 3J illustrates an example of a user interface including a virtual keyboard where the user has selected to move the cursor in the first horizontal direction a number of times, in accordance with one implementation of the disclosure.

FIG. 3K illustrates an example of a user interface including a virtual keyboard where the characters have wrapped around a vertical axis based on the number of selections in FIG. 3J, the user has selected a character under the focus of the cursor to add to a query builder, and the user has selected to move the cursor in the second horizontal direction, in accordance with one implementation of the disclosure.

FIG. 3L illustrates an example of a user interface including a virtual keyboard where the cursor has moved to a list of word suggestions based on the selection in FIG. 3K, and the user has selected an auto-completed title of a media content item to consume, in accordance with one implementation of the disclosure.

DETAILED DESCRIPTION

Figure 1:
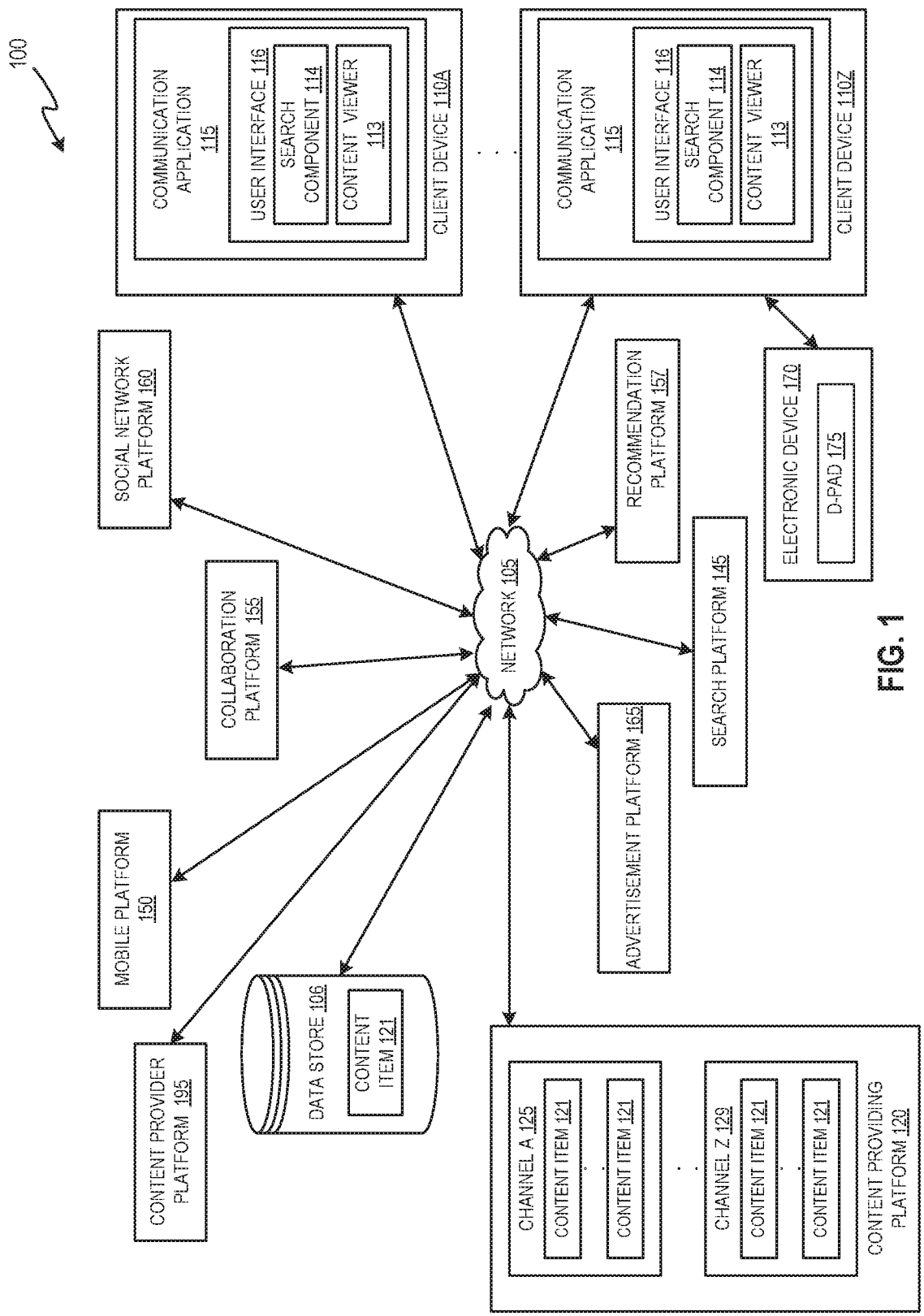
FIG. 1 illustrates an example of system architecture for efficiently searching for media content items, in accordance with one implementation of the disclosure.

A technical problem addressed by implementations of the disclosure is that unnecessary processing resources and network bandwidth resources may be consumed by typing in characters using virtual keyboards. A virtual keyboard may refer to a software component that allows the input of characters without the need for physical keys. The interaction with the virtual keyboard may happen via a touchscreen interface, but can also take place in a different form in virtual or augmented reality. A virtual keyboard may be used when searching for a media content item to consume, entering user feedback, entering an electronic message (e.g., email, text, etc.), entering a website URL, and the like. Although searching for media content items is primarily described below as an example of using the enhanced virtual keyboard of the present disclosure, it should be understood that any suitable implementation that may benefit from the enhanced virtual keyboard is considered to be within the scope of the disclosure.

The terms "media content item" and "content item" may be used interchangeably herein. Typing in a search query may often include multiple key-presses to navigate a cursor around a virtual keyboard and select characters using a directional pad ("D-pad"). The multiple key presses can undesirably consume processing resources on both an electronic device (e.g., remote controller (if used)), client device (e.g., a television (which displays the virtual keyboard)), a server (which performs queries using received characters that were selected), and the network over which media content items and search results are sent while the user is typing a query. This may be particularly problematic for the remote controller where battery life is limited and processing the multiple key presses may drain the batteries.

Further, each time a character is entered by a user, the character is transmitted from the client device to a server to look-up media content items based on the entered character. The server may transmit found media content items that include one or more of the entered characters in their titles as word suggestions (e.g., search suggestions and/or auto-completions) to the client device that is displaying the user interface. Word suggestions may refer to search suggestions that include one or more characters that are different than the characters selected in the virtual keyboard (e.g., "film" may be suggested as a word for "felm" entered via the virtual keyboard). Auto-completions may refer to words that include at least each of the characters selected from the virtual keyboard (e.g., "film" may be suggested as an auto-completed word for "fi" entered via the virtual keyboard).

A data payload for transferring the suggestions may include a thumbnail, the full video file of the media content item, and/or metadata (e.g., title and description of the media content item). Sending multiple data payloads as the user enters the search query can consume processing resources at the server to perform the look-ups, processing resources at the client device by displaying the list of word suggestions, network bandwidth resources by sending multiple data payloads as the characters are entered, and the like. Also, the number of key presses may increase if a suggestion appears in the list but the cursor is at a far end of the virtual keyboard. The user may have to press a key in a certain direction numerous times to move the cursor across the keyboard to the list of word suggestions. This results in a slow process in the user arriving at a desired suggestion and unnecessary compute resource usage to process the excess key presses.

Another technical problem addressed by implementations of the disclosure is that entering a search query in a conventional manner by moving a cursor across multiple rows and columns to find the desired characters can be error-prone for a user. The user has to track the cursor around the virtual keyboard and stop it on the desired character to select that character. If a title includes multiple characters, the more key-presses required to enter the title, the higher the chance of the user selecting a wrong character on accident. Erroneously entering a character may cause a data payload to be transmitted that includes wrong suggested words that were found based on the erroneous character. Thus, more processing resources of the server and client device, and network resources, may be incurred. Additionally, errors in this manner should be corrected by the user by navigating to a delete key of the virtual keyboard, thereby exacerbating the problems described above.

Voice enabled remote controls with embedded microphones allow a user to provide an audible search query. However, these conventional solutions suffer from inaccuracies in detecting the search query spoken by a user.

Accordingly, implementations of the present disclosure relate to reducing the number of key-presses required to enter characters (e.g., entering a search query, an electronic message, user feedback, a review, an email address, a website URL, etc.) by using an enhanced user interface. The key presses may be entered via an electronic device, such as a remote controller, a game controller, a smartphone, or the like. The keys may be included in a directional pad and correspond to a selection (e.g., enter) key and a different respective key for a left, right, up, and down direction. The keys may control the movement of the cursor and/or characters represented in a virtual keyboard of a user interface for searching for media content items provided by a content sharing platform. The user interface including the virtual keyboard may be presented on a display of a client device (e.g., television, display of a desktop or laptop, etc.). The virtual keyboard can include one or more characters, symbols, numbers, and/or special characters. The user may press the keys to request desired characters to come within the focus of the cursor that is fixed within the virtual keyboard.

The user may select desired characters to add the desired characters to a query builder displayed in the user interface.

In contrast to some conventional solutions whereby letters of an alphabet may be provided on multiple slot-machine style reels (with only some letters of the alphabet being displayed at any one time), in some implementations of the present disclosure the full alphabet (e.g., every letter, character, and/or symbol of any suitable language) may be displayed on the virtual keyboard at the same time. In addition, the user may select to change the language presented in the virtual keyboard at any time, and the characters associated with the selected language may be mapped to the virtual keyboard.

A technical solution to the above identified technical problems may include fixing a focus of a cursor to a first row and/or a first column in the virtual keyboard. Movement of the characters under the cursor within the virtual keyboard may be allowed to wrap around the first row and/or the first column in the virtual keyboard when the user requests movement of the cursor in one or more directions. The characters may wrap around a horizontal axis or a vertical axis within the virtual keyboard in a cylindrical fashion when the user requests movement in one or more directions.

In some implementations, the virtual keyboard may be configured as a sphere instead of a cylinder. For example, instead of wrapping characters of the virtual keyboard just around the vertical axis or horizontal axis, the characters of the virtual keyboard may wrap around both the vertical axis and the horizontal axis. In this implementation, the focus of the cursor may be fixed in place at a location of the virtual keyboard and movement of the characters under the focus of the cursor may be constrained to one horizontal direction (e.g., right) and one vertical direction (e.g., down). A key input to move the cursor in another horizontal direction (e.g., left) may move the cursor to the suggestions and/or auto-completions adjacent to the left side of the virtual keyboard, and another key input to move the cursor in another vertical direction (e.g., up) may move the cursor to auto-completions or search results, for example, adjacent to the top side of the virtual keyboard.

Movement of the characters in one or more other directions may be restricted within the virtual keyboard. Instead, when the user requests to move the cursor in the one or more other directions, the cursor can move to the list of word suggestions and/or auto-completions, a query builder, or search results including a representation for each media content item. Accordingly, the list of word suggestions and/or auto-completions, query builder, or search results is one-click away (e.g., less key presses) from the virtual keyboard regardless of which character is under the focus of the cursor in the virtual keyboard. Thus, in one example, the list of word suggestions may include titles based on the one or more characters that are entered and can be updated as subsequent characters are entered. Providing suggested media content items and/or auto-completed media content items based on the characters entered may allow the user to select a media content item that materializes in the list without having to enter the full title (e.g., less key presses) of the media content item in a query builder.

By maintaining the list of word suggestions and/or auto-completions immediately adjacent to the row or the column at which the focus of the cursor is fixed in the virtual keyboard, the user's eye-gaze/visual focus may be centered on the suggestions and/or auto-completions, which may make it easier for the user to select words representing a desired media content item. Further, by fixing the focus of the cursor to within one row and/or one column to allow the characters to cycle under the cursor through that row and/or that column, the user is less likely to make an input selection error because the user does not have to track the cursor around multiple rows and/or columns in the virtual keyboard.

Thus, the technical effect may include reducing the number of key presses that are entered to find a media content item to consume. For example, when the cursor is inside the virtual keyboard, the user can press a key in the direction that is restricted within the virtual keyboard, and the cursor may jump to the list of word suggestions and/or auto-completions with a single key press. Reducing the number of key presses may also reduce the processing resources (on all of a remote control, client device and backend server) and network bandwidth resources that are incurred during character entry because of fewer key presses and fewer suggestion data payloads being sent if a desired media content item is found based on error-free characters in a search query.

FIG. 1 illustrates an example of system architecture 100 for providing a revolving on-screen virtual keyboard for efficient use during media content item searching, in accordance with one implementation of the disclosure. The system architecture 100 includes client devices 110A through 110Z, one or more networks 105, one or more data stores 106, one or more electronic devices 170, and one or more platforms (e.g., content sharing platform 120, recommendation platform 157, advertisement platform 165, mobile platform 150, social network platform 160, search platform 145, content provider platform 195, and collaboration platform 155). The platforms can be one or more computing devices (such as a rackmount server, a router computer, a server computer, a personal computer, a mainframe computer, a laptop computer, a tablet computer, a desktop computer, etc.), data stores (e.g., hard disks, memories, and databases), networks, software components, and/or hardware components.

The one or more networks 105 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 100 are not directly connected to each other. In one implementation, architecture 100 includes separate networks 105.

The one or more data stores 106 can be memory (e.g., random access memory), cache, drives (e.g., hard drive), flash drives, database systems, or another type of component or device capable of storing data. The one or more data stores 106 can include multiple storage components (e.g., multiple drives or multiple databases) that may also span multiple computing devices (e.g., multiple server computers). The data stores 106 can be persistent storage that are capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Content items 121 (media content items) can be stored in one or more data stores 106. The data stores 106 can be part of one or more platforms. Examples of a content item 121 can include, and are not limited to, digital video, digital movies, animated images, digital photos, digital music, digital audio, website content, social media updates, electronic books (ebooks), electronic magazines, digital newspapers, digital audio books, electronic journals, web blogs, real simple syndication (RSS) feeds, electronic comic books, software applications, etc. Content item 121 is also referred to as a media item. The content items 121 may be pre-recorded or live-streaming. For brevity and simplicity, an online video (also hereinafter referred to as a video) is used as an example of a content item 121 throughout this document.

The content items 121 can be provided by content providers. A content provider can be a user, a company, an organization, etc. A content provider can provide content items 121 that are video advertisements. A content provider that provides video advertisements is hereinafter referred to as an advertiser. For example, a content item 121 may be a video advertisement for a car provided by a car advertiser. A service provider can charge an advertiser a fee, for example, when the service provider provides the advertisements on client devices 110A-110Z to be viewed by users.

The client devices 110A-110Z can include devices, such as, televisions, smart phones, cellular telephones, personal digital assistants (PDAs), portable media players, netbooks, laptop computers, electronic book readers, tablet computers, desktop computers, set-top boxes, gaming consoles, and the like.

The individual client devices 110A-110Z can include a communication application 115. A content item 121 can be consumed via the communication application 115, the Internet, etc. As used herein, "media," "media item," "online media item," "digital media," "digital media item," "content," "media content item," and "content item" can include an electronic file that can be executed or loaded using software, firmware or hardware configured to present a content item. In one implementation, the communication applications 115 may be applications that allow users to compose, send, and receive content items 121 (e.g., videos) over a platform (e.g., content sharing platform 120, recommendation platform 157, advertisement platform 165, mobile platform 150, social network platform 160, search platform 145, collaboration platform 155, and content provider platform 195) and/or a combination of platforms and/or networks.

For example, the communication application 115 may be a social networking application, video sharing application, video streaming application, video on demand application, photo sharing application, chat application, mobile application of a content provider or any combination of such applications. The communication application 115 in a client device can render, display, and/or present one or more content items 121 (e.g., videos) to one or more users. For example, the communication application 115 can provide one or more user interfaces (e.g., graphical user interfaces) to be rendered in a display of a client device for sending, receiving and/or playing videos.

In one implementation, the communication application 115 may include a search component 114 and a content viewer 113 and may provide a user interface 116 that may be used to search for media content items via a virtual keyboard and that may play content items 121 in a content viewer 113 portion of the user interface 116. The content viewer 113 may render, display, and/or present content items 121 (e.g., videos) to one or more users. In one implementation, the content viewer 113 is embedded in an application (e.g., communication application 115). In another implementation, the content viewer 113 may be a standalone application (e.g., mobile application, desktop application, gaming console application, television application, etc.), such as communication application 115, that allows users to consume (e.g., play, display) content items 121, such as videos, images, documents (e.g., web pages), etc. For example, the content viewer 113 may be a web browser that can access, retrieve, present, and/or navigate content (e.g., web pages such as Hyper Text Markup Language (HTML) pages, digital media items, etc.) served by a web server of a platform. In another example, the content viewer 113 may display an embedded media player (e.g., a Flash® player or an HTML5 player) that is embedded in a document (e.g., user interface 116 (a web page)).

The content viewer 113 can be provided to the client devices 110A-110Z by a server and/or a platform. For example, the content viewers 113 may be embedded media players that are embedded in user interfaces 116 (e.g., documents (web pages) or screens of a stand-alone application) provided by the content sharing platform 120 or the content provider platform 195. In another example, the content viewers 113 may be applications that are downloaded from a platform (e.g., content sharing platform 120, recommendation platform 157, advertisement platform 165, mobile platform 150, social network platform 160, search platform 145, collaboration platform 155, and content provider platform 195). In another example, the content viewers 113 may be standalone applications that are pre-installed on the client devices 110A-110Z.

The search component 114 may provide a revolving on-screen virtual keyboard to use for efficient searching of the content items 121. In some implementations, the search component 114 may provide the on-screen virtual keyboard for efficient character entry for any suitable purpose (e.g., entering an electronic message, a website URL, a review, user feedback, etc.). The search component 114 may be implemented in computer instructions that are stored on one or more memory devices and that are executed by one or more processing devices. The search component 114 may fix a focus of a character to a first row and/or a first column in a virtual keyboard displayed in the user interface 116. Movement of the characters may be allowed to wrap around the first row and/or the first column in the virtual keyboard when the user requests movement of the cursor in one or more directions. The cursor may remain fixed at its current location as the characters wrap around the first row and/or the first column when the user requests movement of the cursor in the one or more directions. The movement of the characters within the virtual keyboard may be restrained to a direction opposing the one or more directions. When the user requests to move the cursor in one or more other directions, the cursor can jump to a list of word suggestions, auto-completions, and/or search results. Accordingly, the list of word suggestions is one-click away (e.g., less key presses) from the virtual keyboard regardless of which character is under the focus of the cursor in the virtual keyboard. Providing suggested words (e.g., titles of media content items) based on the characters entered may allow the user to select a media content item that materializes in the list without having to enter the full title (e.g., less key presses) of the media content item in a query builder.

The electronic device 170 may be any suitable electronic device capable of communicating directional key inputs to the client device 110A-110Z. For example, the electronic device 170 may include a remote controller, a gaming controller, a smartphone, a tablet, or the like. The electronic device 170 may include a physical or virtual directional pad ("D-pad") 175 that includes keys corresponding to up, down, left, right, and enter (select). The electronic device 170 may receive key input selections when the user presses one or more of the keys on the directional pad 175. The electronic device 170 may transmit the key inputs to the client device 110A-110Z for processing by one or more processors running the search component 114.

As characters are selected from the virtual keyboard displayed in the user interface 116, the client device 110A-110Z may send the selected characters to the one or more platforms to search for suggested or auto-completed content items 121. The one or more platforms may query the data store 106 for the list of word suggestions (e.g., media content item search suggestions and/or auto-completions) and send the list of word suggestions to the requesting client device 110A-110Z. In one example, the list of word suggestions may include one or more entries having a respective title associated with a media content item 121. In addition to words, the list of word suggestions may include emojis (e.g., if the user selects characters "ca", the suggestions may be 🐱🍰🌵🍬, which represent a cat, cake, cactus, and candy, respectively). An emoji may refer to a small digital image or icon used to express an idea, emotion, etc. The list of word suggestions may be sent in a data payload that includes a representation (e.g., link, thumbnail) of the content item 121, an executable file that plays the content item 121, metadata (e.g., title, file type, file size, content item length, etc.), and so forth. The client device 110A-110Z may receive the list of word suggestions and display the titles in a list adjacent to one side of the virtual keyboard and display the representation of the content items 121 adjacent to another side of the virtual keyboard.

In some embodiments, the data store 106 may be local to and reside in memory of the client device 110A-110Z. In this example, the data store 106 may include a dictionary that is searched for the list of word suggestions (e.g., media content item search suggestions and/or auto-completions). Thus, when the user selects characters, requests may not be sent to the one or more platforms, and instead, uses the local data store 106 to search for the list of word suggestions.

The content provider platform 195 can provide a service and the content provider can be the service provider. For example, a content provider may be a video streaming service provider that provides a media streaming service via a communication application 115 for users to play videos, TV shows, video clips, audio, audio clips, and movies, on client devices 110A-110Z via the content provider platform 195.

The social network platform 160 can provide an online social networking service. The social network platform 160 can provide a communication application 115 for users to create profiles and perform activity with their profile. Activity can include updating a profiling, exchanging messages with other users, posting status updates, photos, videos, etc. to share with other users, evaluating (e.g., like, comment, share, recommend) status updates, photos, videos, etc., and receiving notifications of other users activity.

The mobile platform 150 can be and/or include one or more computing devices (e.g., servers), data stores, networks (e.g., phone network, cellular network, local area network, the Internet, and/or a combination of networks), software components, and/or hardware components that can be used to allow users to connect to, share information, and/or interact with each other using one or more mobile devices (e.g., phones, tablet computers, laptop computers, wearable computing devices, etc.) and/or any other suitable device. For example, the mobile platform 150 may enable telephony communication, Short Message Service (SMS) messaging, Multimedia Message Service (MMS) messaging, text chat, and/or any other communication between users. The mobile platform 150 can support user communications via video messaging, video chat, and/or videoconferences.

The collaboration platform 155 can enable collaboration services, such as video chat, video messaging, and audio and/or videoconferences (e.g., among the users of devices 110A-110Z) using, for example, streaming video or voice over IP (VoIP) technologies, cellular technologies, LAN and/or WAN technologies, and may be used for personal, entertainment, business, educational or academically oriented interactions.

The recommendation platform 157 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to generate and provide content recommendations (e.g., articles, videos, posts, news, games, etc.). The recommendation platform 157 can include one or more recommendation servers.

The search platform 145 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to allow users to query the one or more data stores 106 and/or one or more platforms and receive query results.

The advertisement platform 165 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used provide video advertisements.

The content sharing platform 120 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide one or more users with access to content items 121 and/or provide the content items 121 to one or more users. For example, the content sharing platform 120 may allow users to consume, upload, download, and/or search for content items 121. In another example, the content sharing platform 120 may allow users to evaluate content items 121, such as, approve of ("like"), dislike, recommend, share, rate, and/or comment on content items 121. In another example, the content sharing platform 120 may allow users to edit content items 121. The content sharing platform 120 can also include a website (e.g., one or more webpages) and/or one or more applications (e.g., communication applications 115) that may be used to provide one or more users with access to the content items 121, for example, via client devices 110A-110Z. Content sharing platform 120 can include any type of content delivery network providing access to content items 121.

The content sharing platform 120 can include multiple channels (e.g., Channel A 125 through Channel Z 129). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, Channel A 125 may include videos Y and Z. A channel can be associated with an owner, who is a user that can perform actions on the channel. The data content can be one or more content items 121. The data content in the channels can be pre-recorded or live-streaming. Although channels are described as one implementation of a content sharing platform, implementations of the disclosure are not limited to content sharing platforms that provide content items 121 via a channel model.

Figure 2:
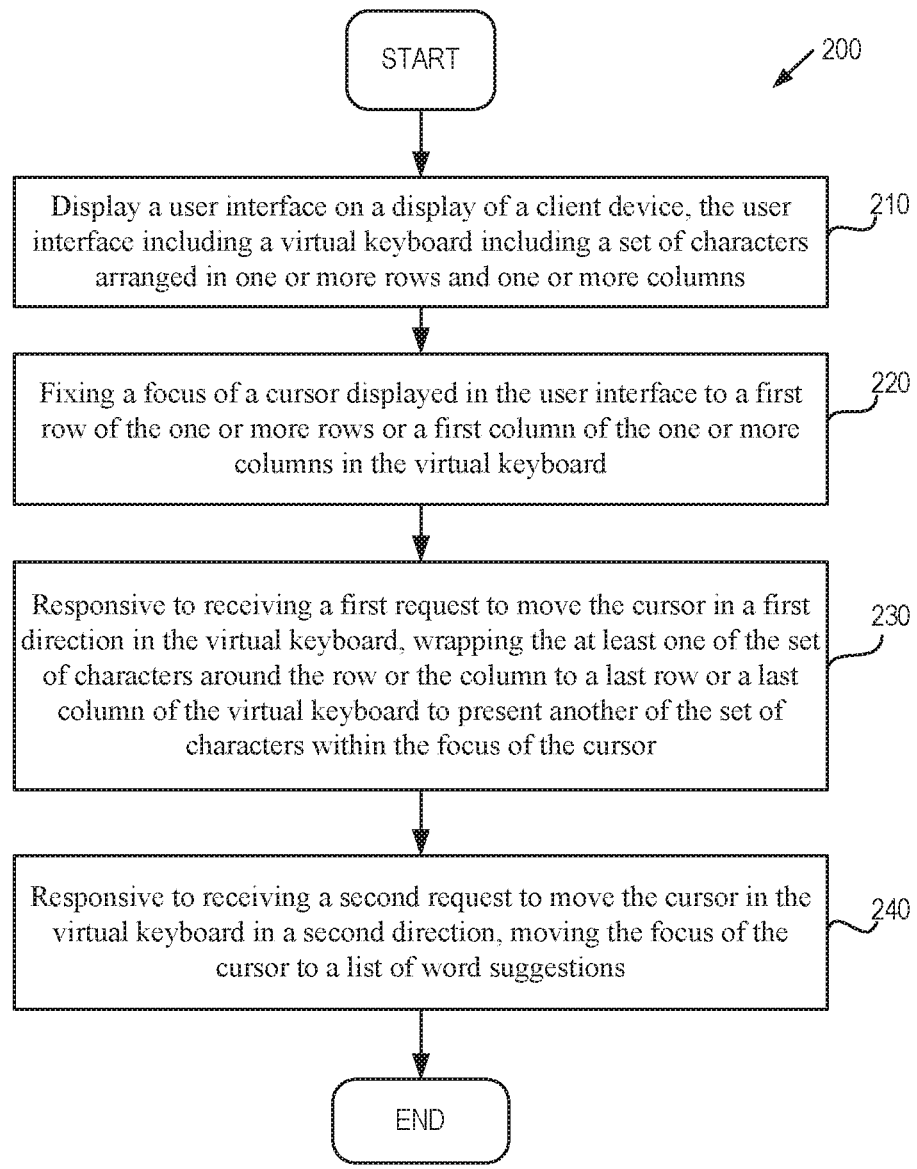
FIG. 2 depicts a flow diagram of aspects of a method for efficiently searching for media content items, in accordance with one implementation of the present disclosure.

FIG. 2 depicts a flow diagram of aspects of a method 200 for efficiently searching for media content items, in accordance with one implementation of the present disclosure. The method 200 is performed by processing logic that may comprise hardware (circuitry, dedicated logic, etc.), software (such as is run on a general purpose computer system or a dedicated machine), or a combination of both. In one implementation, the method 200 is performed by a search component 114 in a client device 110A of FIG. 1. In one implementation, a processing device of a client device performs method 200.

At block 210, the processing device displays a user interface on a display of a client device. In some implementations, the client device may be a television or a computer display. In some implementations, the user interface includes a virtual keyboard including a set of characters or symbols arranged in one or more rows and one or more columns. The set of characters or symbols may be associated with any desired language and include every character (e.g., English letters in the alphabet) or symbol (e.g., Chinese, Japanese, Korean) for that particular language. In some implementations, the characters may include a subset of characters or symbols for the language. The virtual keyboard may also include an option to depict different characters or symbols of another language, an option to depict special characters associated with the depicted language, and/or an option to depict numbers in the virtual keyboard. If any of the options are selected, the virtual keyboard may switch the mapping of the elements of the virtual keyboard from the currently depicted character, symbol, number, or special character to the selected characters, symbols, numbers, or special characters. The virtual keyboard is depicted in more detail in FIGS. 3A-3L.

In some implementations, the processing device may display a list of word suggestions (e.g., search suggestions and/or auto-completions and/or transliterations) immediately adjacent to the first row or the first column where the cursor is fixed. For example, the list of word suggestions may be displayed adjacent to a left side of the virtual keyboard when the cursor is fixed to a first column, or the list of word suggestions may be displayed adjacent to a top side when the cursor is fixed to a first row. The list of words may include search suggestions including titles of media content items that include one or more different characters than the characters selected by the user in the virtual keyboard and that are automatically completed based on the one or more different characters. The list of words may include auto-completions that include titles of media content items that include at least each of the characters entered by the user in the virtual keyboard and that are automatically completed based on each of the characters entered by the user. The list of words may also include transliterations that serve to convert characters typed in one alphabet into corresponding letters of another alphabet. The cursor is one-click or key input away from accessing the list of word suggestions regardless of what character is displayed in the cursor in the virtual keyboard of the user interface.

Such a technique may provide a benefit of reducing key inputs, thereby reducing computing resource usage of the electronic device (e.g., remote controller), the client device, the server of the platform providing the list of media content item suggestions and media content item selected, and/or the network over which the list of word suggestions is transmitted. Further, the enhanced virtual keyboard may increase the user experience of using the user interface, thereby potentially retaining the attention of the user and causing the user to reuse the user interface.

In some implementations, a query builder and/or search results may also be located immediately adjacent to a side of the virtual keyboard to enable the user to easily access the query builder or the search results to select a media content item to consume (e.g., view/play). For example, the query builder may be located adjacent to a top side of the virtual keyboard and the search results may be located adjacent to a bottom side of the virtual keyboard. The query builder may display the characters as the characters are selected using the cursor in the virtual keyboard. It should be appreciated that the list of word suggestions and/or the search results may be dynamically updated for each character that is selected to be added to the query builder. For example, the processing device may receive a request to select one of characters that is in the focus of the cursor in the virtual keyboard and may add the letter to the query builder and send the updated query to the appropriate platform. The platform may search the data store using the updated query and return a list of word suggestions including titles to related media content items. The processing device may update the list of word suggestions to include one or more titles of the media content items including the selected character. Further, the search results may be updated based on the updated list of word suggestions. The search results may include representations (e.g., thumbnails, images, video clips, audio links, etc.) of the media content items related to titles presented in the list of word suggestions.

In some implementations, the user may use a voice enabled remote controller and may speak the title of the media content item they desire to watch into the remote controller. The received audio may be transmitted to the client device, which populates the query builder with the title of the media content item deciphered from the audio. The title may be transmitted by the query builder to the platform (e.g., content provider platform, content sharing platform, etc.) to perform a search and obtain the list of word suggestions and/or search results. The user may use the virtual keyboard including the revolving characters and the fixed cursor to modify the title (e.g., correct any typos) in the query builder to find the desired media content item in the list of word suggestions and/or search results in fewer key inputs than using conventional virtual keyboards.

At block 220, the processing device fixes a focus of a cursor displayed in the user interface to a first row of the one or more rows or a first column of the one or more columns in the virtual keyboard. For example, in some implementations, where the virtual keyboard is configured in a cylindrical fashion, the cursor may be fixed to a first column to allow the characters to wrap or revolve around a vertical axis. In another implementation, where the virtual keyboard is configured in the cylindrical fashion, the cursor may be fixed to a first row to allow the characters to wrap or revolve around a horizontal axis. In yet another implementation, where the virtual keyboard is configured in a spherical fashion, the cursor may be fixed to a first row and a first column to allow the characters to wrap or revolve around both the vertical axis and the horizontal axis.

At block 230, responsive to receiving a first request to move the cursor in a first direction in the virtual keyboard, the processing device wraps or revolves at least one of the set of characters around the row or the column to a last row or a last column of the virtual keyboard to present another character of the set of characters within the focus of the cursor. The first request may be received from an electronic device (e.g., remote controller) communicatively coupled to the client device (e.g., television) when the user selects (e.g., presses) a designated key on the electronic device such as a remote controller. Movement of the characters into the focus of the cursor may be allowed in the virtual keyboard based on the first direction, and the focus of the cursor may remain fixed at its current location as the another character of the set of characters is transitioned into the focus of the cursor. For example, if the user requests to move the cursor right, another character may be moved left to come into the focus of the cursor, since the cursor remains fixed. Thus, in some implementations, movement of the characters within the virtual keyboard may be restricted to a direction opposite the first direction. The last row may be located at an opposing side of the virtual keyboard from the first row and the last column may be located at an opposing side of the virtual keyboard from the first column.

In some embodiments, the first direction may be a horizontal direction (e.g., left or right), and responsive to receiving the first request to move the cursor in the horizontal direction in the virtual keyboard, the processing device may wrap or revolve the at least one of the set of characters around the first column to the last column in the virtual keyboard. In some implementations, the first direction may be a vertical direction (e.g., up or down), and responsive to receiving the first request to move the cursor in the vertical direction in the virtual keyboard, the processing device may wrap or revolve the at least one of the set of characters around the first row to the last row in the virtual keyboard.

At block 240, responsive to receiving a second request to move the cursor in the virtual keyboard in a second direction, the processing device may move the focus of the cursor to a list of word suggestions. The second request may be received from an electronic device (e.g., remote controller) communicatively coupled to the client device (e.g., television). As discussed above, the list of word suggestions may be displayed immediately adjacent to a side of the virtual keyboard such that it is one-click or key input away from the virtual keyboard and is also within the gaze or view of the eyes of the user. The processing device may restrict movement of the set of characters within the virtual keyboard based on the second direction. In some implementations, the second direction (e.g., left or up) is opposite the first direction (e.g., right or down).

FIG. 3A illustrates an example of a user interface 116 including a virtual keyboard 300 where the user has selected to move the cursor in a first horizontal direction, in accordance with one implementation of the disclosure. The user interface 116 may be included in the communication application provided by one of the platforms in FIG. 1. As depicted, the user interface 116 includes the virtual keyboard 300 including a set of characters. The set of characters in the depicted example includes every letter of the English alphabet. However, as may be appreciated, the characters and/or symbols of any suitable language may be displayed in the virtual keyboard 300. The virtual keyboard 300 also includes an option 302 (e.g., a link) to cause the virtual keyboard 300 to switch from displaying the characters to displaying special characters and numbers. The virtual keyboard 300 may also include an option (not depicted) to switch from displaying characters of the English language to displaying characters and/or symbols of any other suitable language.

Also, the user interface 116 includes a query builder 304 that displays characters as they are selected from the virtual keyboard 300. The query builder 304 may be displayed immediately adjacent to a side (e.g., top) of the virtual keyboard 300, as depicted. The virtual keyboard 300 may also display one or more buttons adjacent to a side of the virtual keyboard 300. For example, a "Clear" button may delete any characters that are being displayed in the query builder 304, a "Space" button may add a space to the query being built in the query builder 304, and a "Search" button may cause the client device to transmit the query to the appropriate platform to search for the desired media content item. In some implementations, the query is transmitted to the appropriate platform each time a character is selected by the user and added to the query builder 304, even when the "Search" button is not selected.

The user interface 116 also presents a list of word suggestions 306 immediately adjacent to a side (e.g., left) of the virtual keyboard 300. The list of word suggestions may include titles of media content items from which the user can select to consume (e.g., play). As discussed above, the list of word suggestions 306 may include search suggestions and/or auto-completions. In some implementations, when the user interface 116 is initially presented to the user, the list of word suggestions 306 may not be visible because the user has not selected any characters yet. When the user selects a first character to add to the query builder 304, the list of word suggestions 306 may be received from the appropriate platform based on the selected first character and displayed in the user interface 116.

In the depicted implementation, when the user is initially presented the user interface 116, the list of word suggestions 306 may already be visible even when the user has not selected any characters. The titles included in the list of word suggestions 306 may be based on the preferences (e.g., media content item genre, media content item type, media content item duration, media content items "liked" by the user or other users, etc.) of the user and/or other users, previous selections of media content items by the user and/or other users, previous searches for media content items made by the user and/or other users, and so forth. The user may select to play a media content item included in the list of word suggestions 306 by selecting the title of the media content item. The title may be a link that causes the selected media content item to play in the content viewer 113, either full-screen or in a portion of the user interface 116.

The user interface 116 may also present search results 308 that include a representation of the media content items included in the list of word suggestions 306. That is, in some implementations, the representations of the media content items presented in the search results 308 correspond to the titles of media content items included in the list of word suggestions 306. As depicted, the search results 308 include the content viewer 113 which may be displaying a thumbnail associated with the "Suggestion A" media content item 121. The user may select to play the media content item in the content viewer 113, either full-screen or in the portion of the user interface 116 where the content viewer 113 is located.

The media content items presented in the search results 308 may be dynamically updated as the list of word suggestions 306 is updated.

As discussed above, a cursor 310 (e.g., represented by the circle) of the virtual keyboard 300 may be fixed to a row and/or a column. When the virtual keyboard 300 is configured in a cylindrical fashion, the cursor 310 may be fixed to a column or a row, and when the characters are moved in an allowed direction, the characters may wrap or revolve around the column or row to a respective column or row at an opposite side of the virtual keyboard 300. When the virtual keyboard 300 is configured in a spherical fashion, the cursor 310 may be fixed to a column and a row, and when the characters are moved in an allowed direction, the characters may wrap or revolve around the column and row to a respective column and row at an opposite side of the virtual keyboard 300.

Figure 3D:
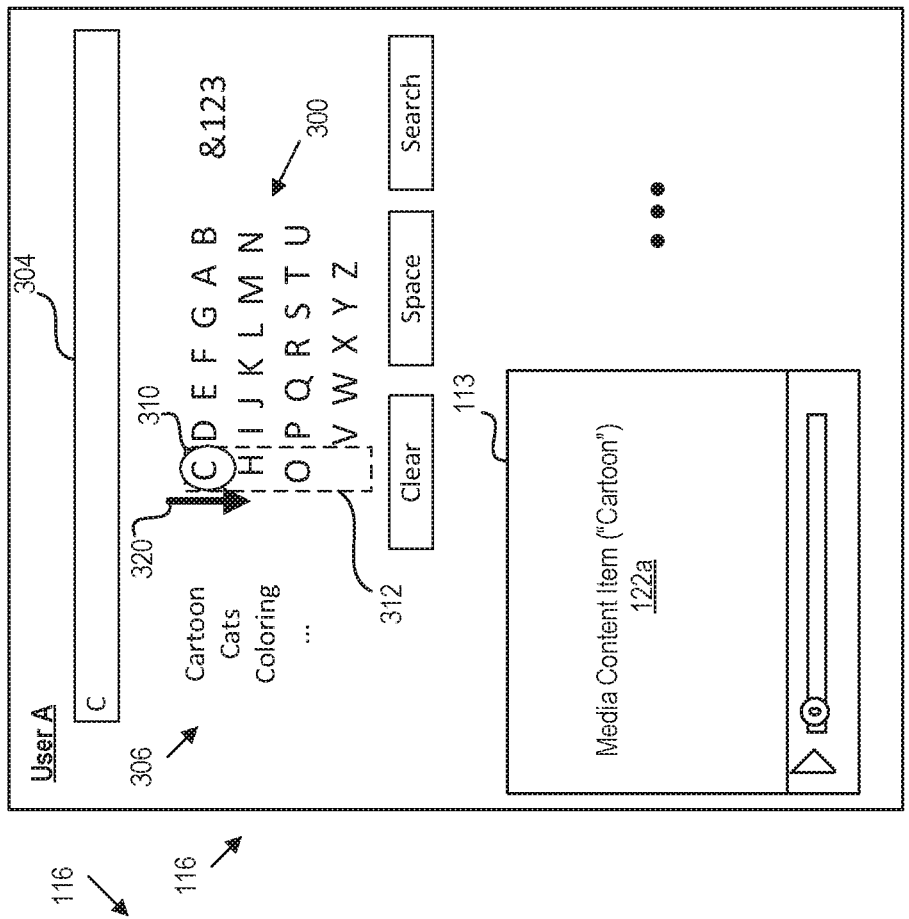
FIG. 3D illustrates an example of a user interface including a virtual keyboard where the user has selected to move the cursor in a vertical direction, in accordance with one implementation of the disclosure.

For purposes of explanation and clarity, the virtual keyboard 300 in FIGS. 3A-3L is configured in a cylindrical fashion and the cursor 310 is fixed to a first column 312. As depicted in FIG. 3A, the character "A" is within the focus of the cursor 310. The user has input a key on an electronic device (e.g., using a directional pad on a remote controller) to move the cursor in a first horizontal direction (e.g., right, as represented by arrow 314). Since the cursor 310 is fixed in column 312, requesting movement of the cursor in the first horizontal direction may cause the characters in the row with the letter "A" to move in a horizontal direction (e.g., left) opposite the first horizontal direction such that a character to the right of the character within the focus of the cursor 310 is moved left into the focus of the cursor 310. Movement of the characters within the virtual keyboard 300 may be restricted to a horizontal direction opposite the first horizontal direction.

Accordingly, as depicted in FIG. 3B, the character "A" has wrapped around a vertical axis (e.g., the first column 312) to a last column 316 in the virtual keyboard 300 based on the user selection, and another character "B" is presented within the focus of the cursor 310. The cursor 310 remains fixed at its current location, which is one-click or key input away from the list of word suggestions 306. The rest of the characters in the row in which the characters "A" and "B" are located are also moved to different columns accordingly. The rows including other characters (e.g., "H I J K L M N", "O P Q R S T U", and "V W X Y Z") may either wrap around the vertical axis as well or remain in place and not moved. Further, the user has selected, using the electronic device, to move the cursor in the first horizontal direction again (as represented by arrow 314).

Figure 3C:
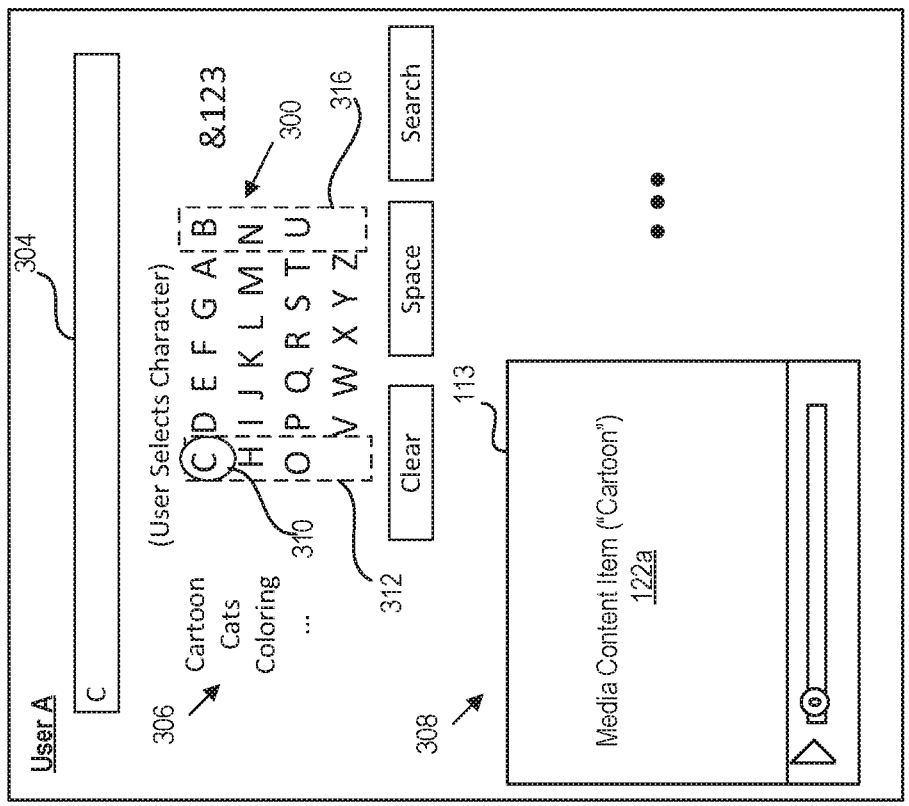
FIG. 3C illustrates an example of a user interface including a virtual keyboard where the characters have wrapped around a vertical axis based on the selection in FIG. 3B, and the user has selected a character under the focus of the cursor to add to a query builder, in accordance with one implementation of the disclosure.

Accordingly, as depicted in FIG. 3C, the character "B" has wrapped around the vertical axis (e.g., the first column 312) to the last column 316 in the virtual keyboard 300 based on the user selection, and another character "C" is presented within the focus of the cursor 310. The cursor 310 remains fixed at its current location, which is one-click or key input away from the list of word suggestions 306. The rest of the characters in the row in which the characters "B" and "C" are located are also moved to different columns accordingly.

Further, the user has selected a character "C" under the focus of the cursor 310 to add to the query builder 304. The user made the selection by clicking or inputting the enter key on the electronic device (e.g., the remote controller communicatively coupled to the client device). The query in the query builder 304 displays the character "C", and the query is sent (e.g., with or without the user clicking the "Search" button) by the client device to the content sharing platform, for example, to search for media content items based on the character "C". The client device receives the list of word suggestions 306 from the content sharing platform and displays it in the user interface 116 immediately adjacent to a left side of the virtual keyboard 300. The list of word suggestions 306 includes search suggestions and/or auto-completions of "Cartoon," "Cats," and "Coloring" based on the input "C" character in the query builder 304. Further, the search results 308 may be updated based on the updated list of word suggestions 306. For example, media content item 122a is updated to present a representation of "Cartoon" based on the list of word suggestions.

In FIG. 3D an example of the user interface 116 including the virtual keyboard 300 is depicted where the user has selected to move the cursor in a first vertical direction (e.g., down, as represented by arrow 320), in accordance with one implementation of the disclosure. If the user selected to move the cursor in a second vertical direction (e.g., up), the cursor 310 may move its focus to the query builder 304, for example. Movement of the cursor in the first vertical direction may be allowed within the column 312 in which the cursor 310 is fixed.

Accordingly, as depicted in FIG. 3E, the cursor 310 is moved down a row to focus on the character "H". The user has selected to move the cursor 310 in the first horizontal direction (e.g., right, as represented by arrow 314) again. As depicted in FIG. 3F, the character "H" has wrapped around the vertical axis (e.g., the first column 312) to the last column 316 in the virtual keyboard 300 based on the user selection, and another character "I" is presented within the focus of the cursor 310. The cursor 310 remains fixed at its current location, which is one-click or key input away from the list of word suggestions 306. The rest of the characters in the row in which the characters "H" and "I" are located are also moved to different columns accordingly.

Further, the user has selected a character "I" under the focus of the cursor 310 to add to the query builder 304. The user made the selection by clicking or inputting the enter key on the electronic device (e.g., the remote controller communicatively coupled to the client device). The query in the query builder 304 displays the character "CI", and the query is sent (e.g., with or without the user clicking the "Search" button) by the client device to the content sharing platform, for example, to search for media content items based on the character "CI". The client device receives the list of word suggestions 306 from the content sharing platform and updates the list of word suggestions 306 in the user interface 116 immediately adjacent to the left side of the virtual keyboard 300. The updated list of word suggestions 306 includes search suggestions and/or auto-completions of "Cinema," "City," "Citation," and "Civilization" based on the input "CI" characters in the query builder 304. Further, the search results 308 may be updated based on the updated list of word suggestions 306. For example, media content item 122a is updated to present a representation of "Cinema" in the content viewer 113 based on the list of word suggestions 306.

Figure 3H:
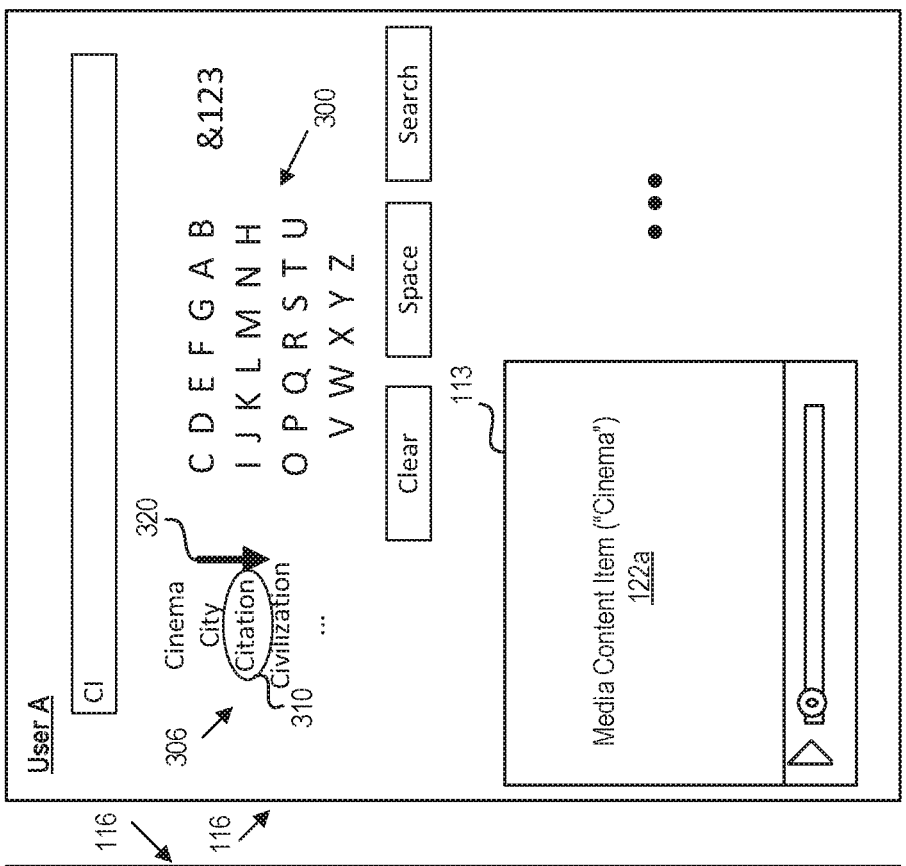
FIG. 3H illustrates an example of a user interface including a virtual keyboard where the cursor has moved to a list of word suggestions based on the selection in FIG. 3G, and the user has selected to move the cursor down in the list of word suggestions, in accordance with one implementation of the disclosure.
Figure 3G:
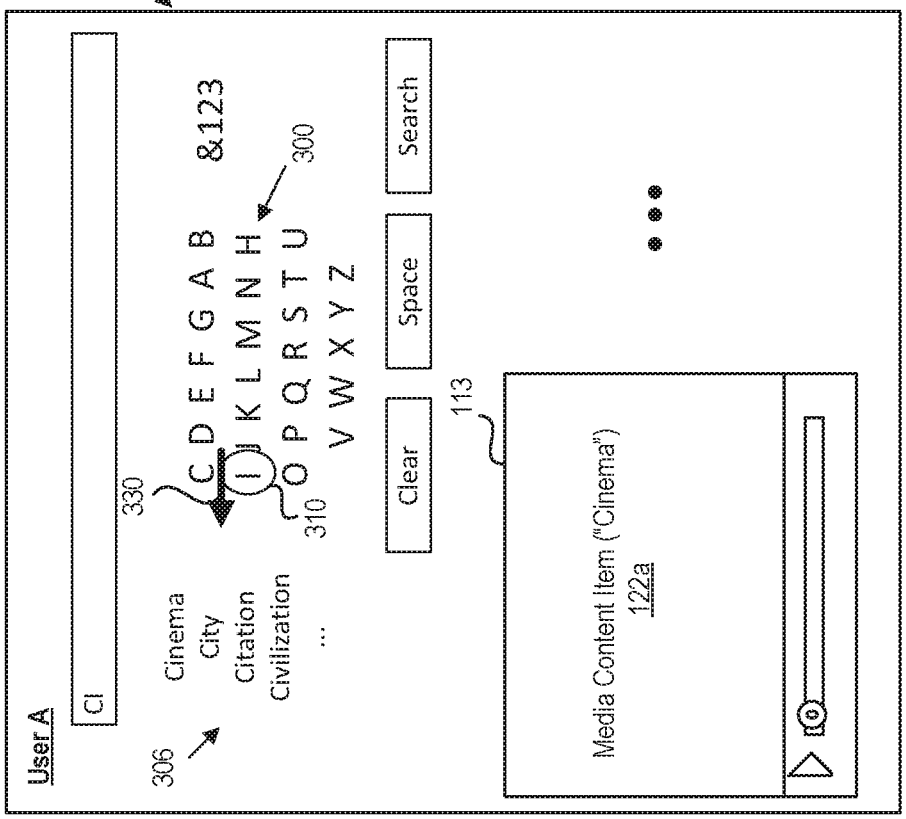
FIG. 3G illustrates an example of a user interface including a virtual keyboard where the user has selected to move the cursor in a second horizontal direction, in accordance with one implementation of the disclosure.

FIG. 3G illustrates an example of the user interface 116 including the virtual keyboard 300 where the user has selected to move the cursor in the virtual keyboard 300 in a second horizontal direction (e.g., left, as represented by arrow 330), in accordance with one implementation of the disclosure. Requesting movement of the cursor 310 within the virtual keyboard 300 in the second direction may be restricted and may cause the cursor 310 to move its focus to the list of word suggestions 306. The content viewer 133 may still present a representation of "Cinema" for the media content item 122a.

Accordingly, FIG. 3H illustrates an example of the user interface 116 including the virtual keyboard 300 where the cursor 310 has moved to a list of word suggestions 306 based on the selection in FIG. 3G. In FIG. 3H, the focus of the cursor 310 is on the word "Citation" in the list of word suggestions 306. The user has selected to move the cursor 310 in a first vertical direction (e.g., down) in the list of suggestions (as represented by arrow 320). The content viewer 133 may still present a representation of "Cinema" for the media content item 122a.

FIG. 3I illustrates an example of the user interface 116 including the virtual keyboard 300 where the user has selected to move the cursor 310 in a first horizontal direction (e.g., right, as represented by arrow 314) to return to the virtual keyboard 300, in accordance with one implementation of the disclosure. When the cursor 310 returns to the virtual keyboard 300, the focus of the cursor 310 is fixed to the first column 312. As depicted in FIG. 3J, the focus of the cursor 310 moved to the character "O" in the virtual keyboard 300. Further, the user has selected to move the cursor in the first horizontal direction three times (e.g., right, as represented by arrows 314). The content viewer 133 may still present a representation of "Cinema" for the media content item 122a.

Accordingly, as depicted in FIG. 3K, the characters "O", "P", and "Q" have wrapped around the vertical axis (e.g., the first column 312) to the last column 316 in the virtual keyboard 300 based on the user selection to move the cursor three times in FIG. 3J. Further, another character "R" is presented within the focus of the cursor 310. The cursor 310 remains fixed at its current location, which is one-click or key input away from the list of word suggestions 306. The rest of the characters in the row in which the characters "O", "P", "Q", and "R" are located are also moved to different columns accordingly. The other characters in other rows may be unaffected and remain in their current locations in the virtual keyboard 300.

Further, in FIG. 3K, the user has selected to add the character "R" within the focus of the cursor 310 to the query builder 304. The user made the selection by clicking or inputting the enter key on the electronic device (e.g., the remote controller communicatively coupled to the client device). The query in the query builder 304 displays the character "CIR", and the query is sent (e.g., with or without the user clicking the "Search" button) by the client device to the content sharing platform, for example, to search for media content items based on the character "CIR". The client device receives the list of word suggestions 306 from the content sharing platform and updates the list of word suggestions 306 in the user interface 116 immediately adjacent to the left side of the virtual keyboard 300. The updated list of word suggestions 306 includes search suggestions and/or auto-completions of "Circuit," "Circumstance," and "Circus" based on the input "CIR" characters in the query builder 304. Further, the search results 308 may be updated based on the updated list of word suggestions 306. For example, media content item 122a is updated to present a representation of "Circuit" in the content viewer 113 based on the list of word suggestions 306.

The user then selected to move the cursor in the virtual keyboard 300 in the second horizontal direction (e.g., left, as represented by arrow 330). The request may cause the focus of the cursor to move to the list of word suggestions 306. For example, in FIG. 3L, an example of the user interface 116 including the virtual keyboard 300 where the cursor 310 has moved to the list of word suggestions 306 based on the selection in FIG. 3K is depicted. The cursor 310 is focused on the word "Circus" in the list of word suggestions 306. The user has selected an auto-completed media content item for consumption, in accordance with one implementation of the disclosure. In response to the user selection of the title from the list of word suggestions 306, the media content item 122a associated with the title may begin playback in the content viewer 113. As depicted, the media content item 122a title "Circus" is being played in the content viewer 113.

Figure 4:
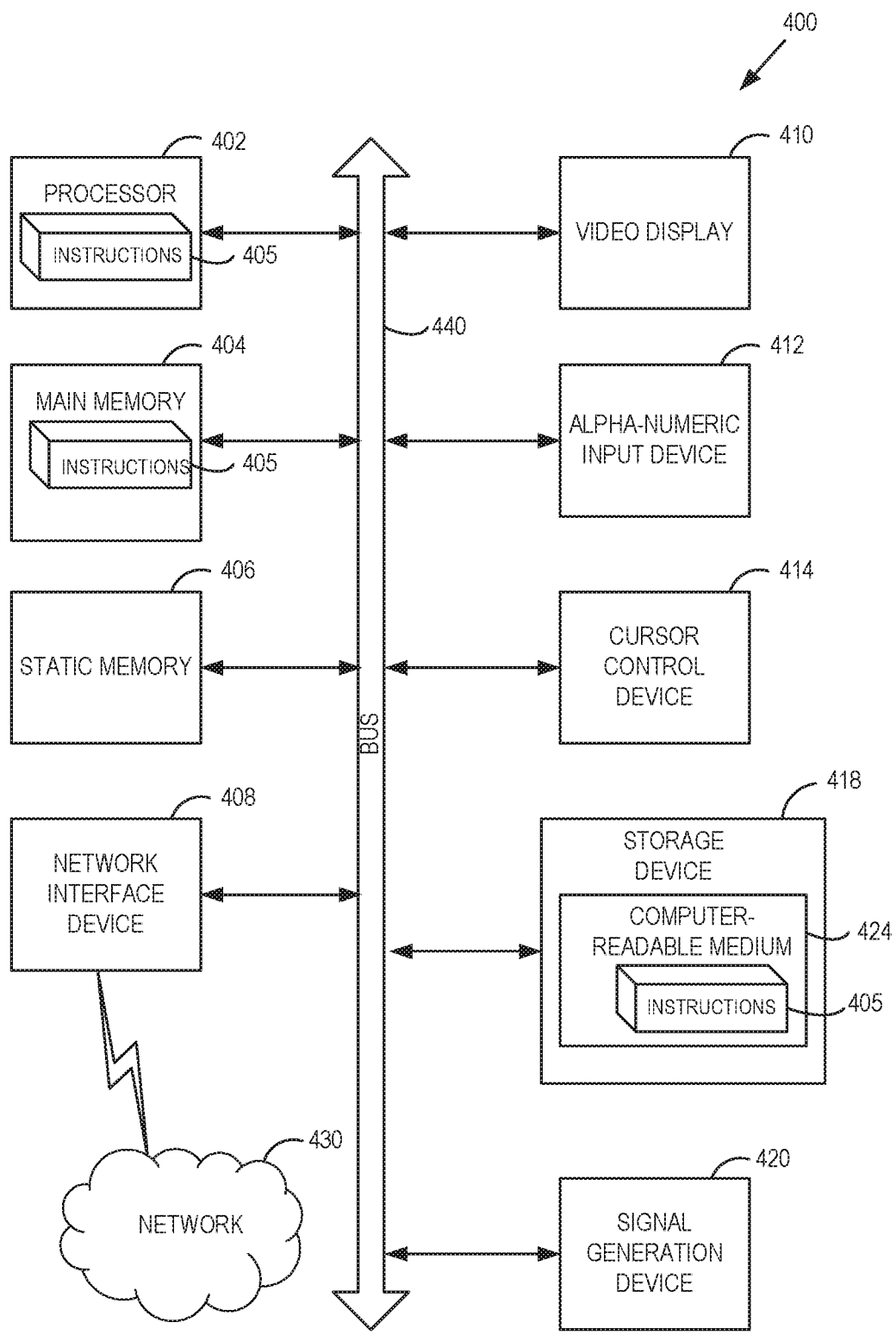
FIG. 4 depicts a block diagram of an example computing device operating in accordance with one or more aspects of the present disclosure.

FIG. 4 illustrates a diagram of a machine in an example form of a computer system 400 within which a set of instructions, for causing the machine to perform any one or more of the methodologies discussed herein, can be executed, in accordance with one implementation of the present disclosure. The computer system 400 can be client device 110A-110Z in FIG. 1. The machine can operate in the capacity of a client machine in client-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 440.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 402 is configured to execute instructions 405 (e.g., search component 114, user interface 116, content viewer 113, communication application 115) for performing the operations and steps discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 414 (e.g., a mouse), and a signal generation device 420 (e.g., a speaker).

The data storage device 418 can include a non-transitory machine-readable storage medium 424 (also computer-readable storage medium) on which is stored one or more sets of instructions 405 (e.g., search component 114, user interface 116, content viewer 113, communication application 115, etc.) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 430 via the network interface device 408.

In one implementation, the instructions 405 include instructions for search component 114 (e.g., search component 114 in FIG. 1) and/or a software library containing methods that call the search component 114. In some implementations, the instructions 405 include instructions for the search component 114, the user interface 116, the content viewer 113, and/or the communication application 115. While the computer-readable storage medium 424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the present disclosure also relate to an apparatus for performing the operations herein. This apparatus may be specially constructed for the discussed purposes, or it may comprise a general purpose computer system selectively programmed by a computer program stored in the computer system. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, or other type of machine-accessible storage media.

What is claimed is:

1. A method comprising:
    displaying a user interface on a display of a client device, the user interface comprising a virtual keyboard including a plurality of characters arranged in a plurality of rows and a plurality of columns, wherein at least two or more of the plurality of rows each comprise characters arranged in the plurality of columns;
    fixing a focus of a cursor displayed in the user interface to a first row of the plurality of rows and a first column of the plurality of columns in the virtual keyboard, wherein at least a first character of the plurality of characters is within the focus of the cursor;
    receiving a first request to move the cursor in a first direction in the virtual keyboard;
    responsive to receiving the first request to move the cursor in the first direction in the virtual keyboard, wrapping at least the first character of the plurality of characters around the first row to a last row of the plurality of rows in the virtual keyboard to present a second character of the plurality of characters within the focus of the cursor;
    receiving a second request to move the cursor in a second direction in the virtual keyboard;
    responsive to receiving the second request to move the cursor in the second direction in the virtual keyboard, wrapping at least the first character of the plurality of characters around the first column to a last column of the plurality of columns in the virtual keyboard to present at least a third character of the plurality of characters within the focus of the cursor;
    receiving a third request to move the cursor in the virtual keyboard in a third direction; and
    responsive to receiving the third request to move the cursor in the virtual keyboard in the third direction, moving the focus of the cursor to a list of word suggestions.

2. The method of claim 1, further comprising restricting movement of the plurality of characters within the virtual keyboard to a direction opposite the first direction.

3. The method of claim 1, further comprising displaying the list of word suggestions immediately adjacent to the first row or the first column.

4. The method of claim 1, wherein the second direction is a horizontal direction, and the second request is to move the cursor in the horizontal direction in the virtual keyboard.

5. The method of claim 1, wherein the first direction is a vertical direction, and the first request is to move the cursor in the vertical direction in the virtual keyboard.

6. The method of claim 1, further comprising displaying a query builder that displays one or more characters as the one or more characters are selected from the virtual keyboard.

7. The method of claim 1, wherein the last row is located at an opposing side of the virtual keyboard from the first row and the last column is located at an opposing side of the virtual keyboard from the first column.

8. The method of claim 1, further comprising:
    responsive to receiving a fourth request to select one of the plurality of characters that are within the focus of the cursor, updating the list of word suggestions to include one or more entries including the selected one of the plurality of characters.

9. The method of claim 8, wherein at least one of the one or more entries in the list has a word that is automatically completed based on the selected one of the plurality of characters.

10. The method of claim 1, wherein the second direction is opposite the first direction.

11. The method of claim 1, wherein the plurality of characters comprise all letters or symbols of a language being presented in the virtual keyboard.

12. The method of claim 1, wherein the client device is a television and the first request and the second request are received from a remote controller in communication with the television.

13. A non-transitory, computer-readable medium storing instructions that, when executed, cause a processing device to:
    display a user interface on a display of a client device, the user interface comprising a virtual keyboard including a plurality of characters arranged in a plurality of rows and a plurality of columns, wherein at least two or more of the plurality of rows each comprise characters arranged in the plurality of columns;
    fix a focus of a cursor displayed in the user interface to a first row of the plurality of rows and a first column of the plurality of columns in the virtual keyboard, wherein at least a first character of the plurality of characters is within the focus of the cursor;
    receive a first request to move the cursor in a first direction in the virtual keyboard;
    responsive to receiving the first request to move the cursor in the first direction in the virtual keyboard, wrap at least the first character of the plurality of characters around the first row to a last row of the plurality of rows in the virtual keyboard to present a second character of the plurality of characters within the focus of the cursor;
    receive a second request to move the cursor in a second direction in the virtual keyboard;
    responsive to receiving the second request to move the cursor in the second direction in the virtual keyboard, wrap at least the first character of the plurality of characters around the first column to a last column of the plurality of columns in the virtual keyboard to present at least a third character of the plurality of characters within the focus of the cursor;
    receive a third request to move the cursor in the virtual keyboard in a third direction; and responsive to receiving the third request to move the cursor in the virtual keyboard in the third direction, move the focus of the cursor to a list of word suggestions.

14. The computer-readable medium of claim 13, wherein said instructions, when executed, cause the processing device to restrict movement of the plurality of characters within the virtual keyboard to a direction opposite the first direction.

15. The computer-readable medium of claim 13, wherein said instructions, when executed, cause the processing device to display the list of word suggestions immediately adjacent to the first row or the first column.

16. The computer-readable medium of claim 13, wherein the second direction is a horizontal direction, and the second request is to move the cursor in the horizontal direction in the virtual keyboard.

17. The computer-readable medium of claim 13, wherein the first direction is a vertical direction, and the first request is to move the cursor in the vertical direction in the virtual keyboard.

18. The computer-readable medium of claim 13, wherein said instructions, when executed, cause the processing device to display a query builder that displays one or more characters as the one or more characters are selected from the virtual keyboard.

19. The computer-readable medium of claim 13, wherein the last row is located at an opposing side of the virtual keyboard from the first row and the last column is located at an opposing side of the virtual keyboard from the first column.

20. A system, comprising:
a memory device;
a processing device operatively coupled to the memory device, the processing device to:
display a user interface on a display of a client device, the user interface comprising a virtual keyboard including a plurality of characters arranged in a plurality of rows and a plurality of columns, wherein at least two or more of the plurality of rows each comprise characters arranged in the plurality of columns;
fix a focus of a cursor displayed in the user interface to a first row of the plurality of rows and a first column of the plurality of columns in the virtual keyboard, wherein at least a first character of the plurality of characters is within the focus of the cursor;
receive a first request to move the cursor in a first direction in the virtual keyboard;
responsive to receiving the first request to move the cursor in the first direction in the virtual keyboard, wrap at least the first character of the plurality of characters around the first row to a last row of the plurality of rows in the virtual keyboard to present a second character of the plurality of characters within the focus of the cursor;
receive a second request to move the cursor in a second direction in the virtual keyboard;
responsive to receiving the second request to move the cursor in the second direction in the virtual keyboard, wrap at least the first character of the plurality of characters around the first column to a last column of the plurality of columns in the virtual keyboard to present at least a third character of the plurality of characters within the focus of the cursor;
receive a third request to move the cursor in the virtual keyboard in a third direction; and
responsive to receiving the third request to move the cursor in the virtual keyboard in the third direction, move the focus of the cursor to a list of word suggestions.

\* \* \* \* \*